(12) United States Patent
Lee et al.

(10) Patent No.: US 12,169,572 B2
(45) Date of Patent: Dec. 17, 2024

(54) METHOD AND APPARATUS FOR MANAGING LWE INSTANCE

(71) Applicant: SAMSUNG SDS CO., LTD., Seoul (KR)

(72) Inventors: Joohee Lee, Seoul (KR); Eunkyung Kim, Seoul (KR); Kyu Young Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 261 days.

(21) Appl. No.: 17/973,013

(22) Filed: Oct. 25, 2022

(65) Prior Publication Data

US 2023/0130882 A1 Apr. 27, 2023

(30) Foreign Application Priority Data

Oct. 27, 2021 (KR) .................. 10-2021-0144640

(51) Int. Cl.
*G06F 21/00* (2013.01)
*G06F 21/60* (2013.01)

(52) U.S. Cl.
CPC .................. *G06F 21/602* (2013.01)

(58) Field of Classification Search
None
See application file for complete search history.

(56) References Cited

U.S. PATENT DOCUMENTS

| | | | | |
|---|---|---|---|---|
| 11,569,993 | B2* | 1/2023 | Garcia Morchon | .. H04L 9/3093 |
| 2018/0109376 | A1* | 4/2018 | Gentry | .... H04L 9/0838 |
| 2022/0014386 | A1* | 1/2022 | Sehrawat | .... H04L 63/0876 |
| 2022/0100889 | A1* | 3/2022 | Tan | .... G06F 21/6245 |
| 2023/0130882 | A1* | 4/2023 | Lee | .... H04L 9/3093 380/28 |
| 2023/0237374 | A1* | 7/2023 | Lee | .... G06N 3/048 706/12 |

OTHER PUBLICATIONS

Joel Alwen et al., "The double ratchet: security notions, proofs, and modularization for the signal protocol.", Annual International Conference on the Theory and Applications of Cryptographic Techniques (EUROCRYPT). Springer, Cham, 2019.

* cited by examiner

*Primary Examiner* — Jeffery L Williams
(74) *Attorney, Agent, or Firm* — NSIP Law

(57) ABSTRACT

A learning with errors (LWE) instance management method according to an embodiment may include obtaining, from one or more user devices among a plurality of user devices, one or more learning with errors (LWE) instances and one or more extended LWE instances including reuse tags associated with the LWE instances, storing the one or more extended LWE instances, receiving, from a first device among the plurality of user devices, a request for an LWE instance produced by a second device among the plurality of user devices, and identifying, based on a reuse tag included in each of the one or more extended LWE instances, a target extended LWE instance including an LWE instance produced by the second device among the one or more extended LWE instances, and providing the LWE instance included in the target extended LWE instance to the first device.

19 Claims, 13 Drawing Sheets

METHOD AND APPARATUS FOR MANAGING LWE INSTANCE

CROSS-REFERENCE TO RELATED APPLICATION AND CLAIM OF PRIORITY

This application claims the benefit under 35 USC § 119 of Korean Patent Application No. 10-2021-0144640, filed on Oct. 27, 2021, in the Korean Intellectual Property Office, the disclosure of which is herein incorporated by reference in its entirety.

BACKGROUND

1. Field of the Invention

Disclosed embodiments relate to cryptographic technology based on a learning with errors (LWE) problem.

2. Description of the Prior Art

Quantum computers capable of hacking a standard public key cryptography such as an RSA, an elliptic curve cryptography, and the like have been acceleratedly developed, and thus the standardization and research on a post-Quantum cryptography (PQC), which is a secure cryptography, is actively being conducted internationally even after the development of the Quantum computer.

In 2017, NIST started a post-Quantum cryptography standardization public contest project which is safe from the threat of a Quantum computer. In the NIST standardization public contest, many candidate algorithms suggested in consideration of various problems such as a lattice-based problem, code-based problem, multivariate-based problem, and the like. Among them, lattice-based algorithms have received attention since the algorithms are efficient when compared to other problem-based algorithms from the perspective of size/speed.

Five candidates among seven finalists in the third round of the NIST standardization public contest are lattice-based algorithms, and Kyber and Saber that are key encapsulation algorithms, and Dilithium that is an electronic signature algorithm, among the lattice-based algorithms, have been proven to be safe based on a LWE problem that is mathematical conundrum.

An LWE instance may be widely utilized for designing an LWE problem-based public key cryptography, key encapsulation, an electronic signature, a homomorphic cryptography, a function cryptography, and the like. Conventionally, in order to guarantee security, an LWE instance is designed to be produced once and repeatedly used, or to be discarded immediately after usage, without being reused for other purposes. However, in the case that an LWE is used once and is discarded, the costs for producing, transmitting, and storing an LWE instance may be increased. In the case that an LWE instance is repeatedly used indefinitely for efficiency, there may be risk of vulnerability to a key reuse attack.

SUMMARY

Embodiments disclosed are to provide a method and apparatus for managing an LWE instance using a learning with errors (LWE) problem-based operation.

An LWE instance management method according to an embodiment may be a method of managing an LWE instance, performed by one or more processors in a device, the method including an operation of obtaining, from one or more user devices among a plurality of user devices, one or more learning with errors (LWE) instances and one or more extended LWE instances including reuse tags associated with the LWE instances, an operation of storing the one or more extended LWE instances, an operation of receiving, from a first device among the plurality of user devices, a request for an LWE instance produced by a second device among the plurality of user devices, an operation of identifying, based on a reuse tag included in each of the one or more extended LWE instances, a target extended LWE instance including an LWE instance produced by the second device among the one or more extended LWE instances, and an operation of providing the LWE instance included in the target extended LWE instance to the first device.

The method may further include an operation of deleting the target extended LWE instance, after the providing operation.

The reuse tag may include owner identification information of secret information associated with a corresponding LWE instance, the request may include owner identification information of secret information of the LWE instance produced by the second device, and the operation of identifying may identify an extended LWE instance of which the reuse tag includes owner identification information that is identical to the owner identification information included in the request, as the target extended LWE instance among the one or more extended LWE instances.

The providing operation may include an operation of determining whether the LWE instance included in the target extended LWE instance is an available LWE instance, and an operation of providing the LWE instance included in the target extended LWE instance to the first device in the case that the LWE instance included in the target extended LWE instance is an available LWE instance.

The reuse tag may include information associated with the point in time at which a corresponding LWE instance is produced, and the determining operation determines, based on the point in time at which the LWE instance included in the target extended LWE instance is produced, whether the LWE instance included in the target extended LWE instance is an available LWE instance.

The storing operation may store the one or more extended LWE instances and a counter value for each of the one or more extended LWE instances, and the determining operation may determine, based on a counter value for the target extended LWE instance, whether the LWE instance included in the target extended LWE instance is an available LWE instance.

The method may further include an operation of updating the counter value for the target extended LWE instance after the providing operation.

An LWE instance management method according to an embodiment may be a method of managing an LWE instance, performed by one or more processors in a device, the method including an operation of obtaining, from one or more user devices among a plurality of user devices, one or more learning with errors (LWE) instances and one or more extended LWE instances including reuse tags associated with the LWE instances, an operation of storing the one or more extended LWE instances, and an operation of identifying, based on a reuse tag included in each of the one or more extended LWE instances, a target extended LWE instance including an LWE instance produced by a first device among the one or more extended LWE instances, and an operation of performing an operation using the LWE instance included in the target extended LWE instance.

The method may further include an operation of deleting the target extended LWE instance after performing the operation.

The reuse tag may include owner identification information of secret information associated with a corresponding LWE instance and the operation of identifying may identify an extended LWE instance of which the reuse tag includes owner identification information that is identical to owner identification information of secret information associated with the LWE instance produced by the first device, as the target extended LWE instance among the one or more extended LWE instances.

The operation of performing may include an operation of determining whether the LWE instance included in the target extended LWE instance is an available LWE instance, and an operation of performing an operation using the LWE instance included in the target extended LWE instance in the case that the LWE instance included in the target extended LWE instance is an available LWE instance.

The reuse tag may include information associated with the point in time at which a corresponding LWE instance is produced, and the operation of determining may determine, based on the point in time at which the LWE instance included in the target extended LWE instance is produced, whether the LWE instance included in the target extended LWE instance is an available LWE instance.

The operation of storing may store the one or more extended LWE instances and a counter value for each of the one or more extended LWE instances, and the operation of determining may determine, based on a counter value for the target extended LWE instance, whether the LWE instance included in the target extended LWE instance is an available LWE instance.

The method may further include an operation of updating the counter value for the target extended LWE instance after performing the operation.

An LWE instance management apparatus according to an embodiment is an apparatus for managing an LWE instance, the apparatus including one or more processors, and the one or more processors are configured to obtain, from one or more user devices among a plurality of user devices, one or more learning with errors (LWE) instances and one or more extended LWE instances including reuse tags associated with the LWE instances, to store one or more extended LWE instances, and in the case that a request for an LWE instance produced by a second device among the plurality of user devices is received from a first device among the plurality of user devices, to identify, based on a reuse tag included in each of the one or more extended LWE instances, a target extended LWE instance including an LWE instance produced by the second device among the one or more extended LWE instances, and to provide, to the first device, the LWE instance included in the target extended LWE instance.

The operation of identifying the LWE instance may delete the target extended LWE instance, after providing the LWE instance included in the target extended LWE instance to the first device.

The reuse tag may include owner identification information of secret information associated with a corresponding LWE instance, and the request may include owner identification information of secret information of the LWE instance produced by the second device, and the operation of identifying the LWE instance may identify an extended LWE instance of which the reuse tag includes owner identification information that is identical to the owner identification information included in the request, as the target extended LWE instance among the one or more extended LWE instances.

The operation of identifying the LWE instance may determine whether the LWE instance included in the target extended LWE instance is an available LWE instance, and the operation of providing to the first device may provide the LWE instance included in the target extended LWE instance to the first device in the case that the LWE instance included in the target extended LWE instance is an available LWE instance.

The reuse tag may include information associated with the point in time at which a corresponding LWE instance is produced, and the operation of identifying the LWE instance may determine, based on the point in time at which the LWE instance included in the target extended LWE instance is produced, whether the LWE instance included in the target extended LWE instance is an available LWE instance.

The operation of identifying the LWE instance may store the one or more extended LWE instances and a counter value for each of the one or more extended LWE instances, and may determine, based on a counter value for the target extended LWE instance, whether the LWE instance included in the target extended LWE instance is an available LWE instance.

The operation of identifying the LWE instance may update the counter value for the target extended LWE instance, after providing the LWE instance included in the target extended LWE instance to the first device.

An LWE instance management apparatus according to an embodiment may be an apparatus for managing an LWE instance, the apparatus including one or more processor, and the one or more processors are configured to obtain, from one or more user devices among a plurality of user devices, one or more learning with errors (LWE) instances and one or more extended LWE instances including reuse tags associated with the LWE instances, to store the one or more extended LWE instances, and identify, based on a reuse tag included in each of the one or more extended LWE instances, a target extended LWE instance including an LWE instance produced by a first device among the one or more extended LWE instances, and to perform an operation using the LWE instance included in the target extended LWE instance.

The operation of identifying the LWE instance may delete the target extended LWE instance, after performing an operation using the LWE instance included in the target extended LWE instance.

The reuse tag may include owner identification information of secret information associated with a corresponding LWE instance, and the operation of identifying the LWE instance may identify an extended LWE instance of which the reuse tag includes owner identification information that is identical to owner identification information of secret information associated with the LWE instance produced by the first device, as the target extended LWE instance among one or more extended LWE instances.

The operation of identifying LWE instance may determine whether the LWE instance included in the target extended LWE instance is an available LWE instance, and the operation of performing the operation may perform an operation using the LWE instance included in the target extended LWE instance in the case that the LWE instance included in the target extended LWE instance is an available LWE instance.

The reuse tag may include information associated with the point in time at which a corresponding LWE instance is produced, and the operation of identifying the LWE instance may determine, based on the point in time at which the LWE instance included in the target extended LWE instance is produced, whether the LWE instance included in the target extended LWE instance is an available LWE instance.

The operation of identifying the LWE instance may store the one or more extended LWE instances and a counter value for each of the one or more extended LWE instances, and may determine, based on a counter value for the target extended LWE instance, whether the LWE instance included in the target extended LWE instance is an available LWE instance.

The operation of identifying the LWE instance may update the counter value for the target extended LWE instance after performing an operation using the LWE instance included in the target extended LWE instance.

According to embodiments disclosed, one or more LWE instances produced by various devices are managed in an integrative manner using the reuse tag of an LWE instance, and secure reuse of each LWE instance is enabled and thus, the costs of producing, transmitting, and storing an LWE instance can be decreased and also the security of a system using an LWE instance can be guaranteed.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EMBODIMENTS

Hereinafter, detailed embodiments of the present disclosure will be described with reference to drawings. Detailed descriptions below will be provided to help comprehensive understanding of the method, device, and/or system described in the present specification. However, this is merely an example, and the present disclosure is not limited thereto.

When it is determined that detailed descriptions of a well-known art related to the present disclosure obfuscate the subject matter of the present disclosure, the detailed descriptions thereof will be omitted herein. The terms to be described below are terms defined in consideration of functions in the present disclosure, and may differ depending on a user, the intention of an operator, practice, or the like. Therefore, the definitions of the terms should be made based on the contents throughout the present specification. The terms used in the detailed description are merely for the purpose of describing embodiments of the present disclosure and are not intended to be restrictive. The singular forms are intended to include the plural forms as well, unless the context clearly indicates otherwise. In this description, that the terms "comprises," or "includes," are used to indicate some features, numbers, steps, operations, elements, or part or a combination thereof, but should not construe that the presence or possibility of one or more other features, numbers, steps, operations, elements, and/or part or combination thereof is excluded.

Figure 1:
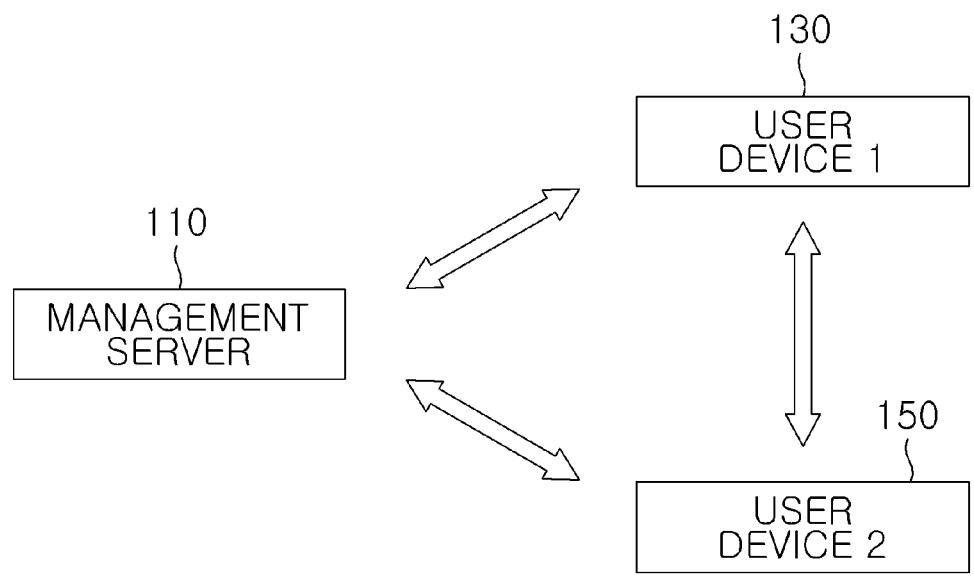
FIG. 1 is a diagram illustrating the configuration of an LWE instance management system according to an embodiment.

FIG. 1 is a diagram illustrating the configuration of a learning with error (LWE) instance management system according to an embodiment.

Referring to FIG. 1, an LWE instance management system 100 according to an embodiment may include a management server 110 and a plurality of user devices 130 and 150.

The management server 110 is a server that obtains and stores an LWE instance and an extended LWE instance from at least one of the plurality of user devices 130 and 150, and provides an LWE instance, requested by a predetermined user device among the plurality of user devices 130 and 150, among LWE instances respectively included in one or more stored extended LWE instances, to a corresponding predetermined user device.

Hereinafter, the LWE instance denotes a pair of matrix A and matrix B on a polynomial ring $R_q = Z_q[X]/(X^n+1)$ that satisfies Equation 1 below (in this instance, $Z_q[X]$ is a polynomial ring for an indeterminate X that uses, as a coefficient, an integer number in set $Z_q$ of integer numbers of which the order are prime number q, and n is repeated multiplication of 2).

$$LWE(S) = (A, B = A \cdot S + E) \in R_q^{k \times l} \times R_q^k \qquad \text{[Equation 1]}$$

In Equation 1, A denotes a random matrix that satisfies $A \in R_q^{k \times l}$, S denotes secret information that satisfies $S \in R_q^l$, and E denotes an error that satisfies $E \in R_q^l$. In addition, q, k and l are public parameters that respectively satisfy q, k, l>0.

A reuse tag of an LWE instance is information used for identifying a predetermined LWE instance, and may include owner identification information associated with an owner of secret information (i.e., S of Equation 1) associated with the LWE instance.

In this instance, the owner identification information may include at least one among, for example, device identification information associated with a device that possesses secret information among the plurality of user devices 130 and 150, and user identification information associated with a user of a device that possesses secret information. The device identification information may be, for example, a previously allocated device ID, a MAC address, an IP address, and the like, but is not necessarily limited thereto. Various types of information available for distinctively identifying a predetermined user device may be used as device identification information. In addition, the user information may be, for example, a user ID, but is not necessarily limited thereto. Various types of information available for distinctively identifying a predetermined user may be used as user identification information.

According to an embodiment, a reuse tag associated with an LWE instance may further include information associated with at least one among LWE instance identification information, the point in time of producing an LWE instance, and a public parameter used for producing an LWE instance, in addition to an owner identification information associated with an owner of secret information.

Each of the plurality of user devices 130 and 150 may be a device for performing an operation using an LWE instance, and may be, for example, a smart phone, a tablet PC, a desktop PC, a laptop PC, a phablet, a smart watch, and the like, but is not necessarily limited to a device in a predetermined form.

An operation performed using an LWE instance may include various types of operations performed using an LWE instance in a public key cryptography algorithm based on an LWE problem that is mathematical conundrum, an electronic signature algorithm, a key encapsulation algorithm, a homomorphic cryptographic algorithm, a function cryptographic algorithm, and the like, and the type of operation performed using an LWE instance and a detailed operation scheme may differ depending on an algorithm applied.

Although the example of FIG. 1 illustrates that two user devices 130 and 150 are used, this is merely an example and is not necessarily limited thereto.

Figure 2:
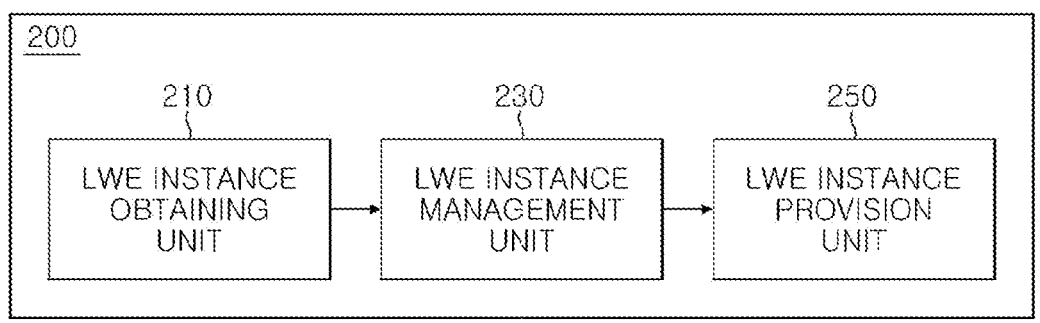
FIG. 2 is a diagram illustrating the configuration of an LWE instance management apparatus according to an embodiment.

FIG. 2 is a diagram illustrating the configuration of an LWE instance management apparatus according to an embodiment.

An LWE instance management apparatus 200 illustrated in FIG. 2 may be, for example, the LWE management server 110 of FIG. 1 or a component included in the LWE management server 110.

Referring to FIG. 2, the LWE instance management apparatus 200 according to an embodiment may include an LWE instance obtaining unit 210, an LWE instance management unit 230, and an LWE instance provision unit 250.

The LWE instance obtaining unit 210 may obtain one or more LWE instances and one or more extended LWE instances including reuse tags of LWE instances from one or more user devices among the plurality of user devices 130 and 150.

The LWE instance management unit 230 may store one or more extended LWE instances obtained from the LWE instance obtaining unit 210. In addition, in the case that a request for an LWE instance produced by a second device among the plurality of user devices 130 and 150 is received from a first device among the plurality of user devices 130 and 150, the LWE instance management unit 230 may identify, based on a reuse tag included in each of the one or more stored extended LWE instances, a target extended LWE instance including an LWE instance produced by the second device among the one or more stored extended LWE instances.

In addition, the LWE instance provision unit 250 may provide, to the first device, the LWE instance included in the target extended LWE instance identified by the LWE instance management unit 230.

According to an embodiment, after providing the LWE instance included in the target extended LWE instance to the first device, the LWE instance management unit 230 may delete the corresponding target extended LWE instance.

According to an embodiment, the request received from the first device may include owner identification information associated with an owner of secret information corresponding to the LWE instance produced by the second device. In this instance, the LWE instance management unit 230 may identify an extended LWE instance of which the reuse tag includes owner identification information that is identical to the owner identification information included in the request received from the first device, as the target extended LWE instance among the one or more stored extended LWE instances.

In addition, according to an embodiment, in the case that the point in time at which an LWE instance is produced is included in a reuse tag as described above, the LWE instance management unit 230 may identify a target extended LWE instance, and based on the point in time at which an LWE instance included in the target extended LWE instance is produced, may determine whether the LWE instance included in the target extended LWE instance is available. In addition, in the case that the LWE instance included in the target extended LWE instance is identified as an available LWE instance, the LWE instance provision unit 250 may provide the LWE instance included in the target extended LWE instance to the first device.

As a detailed example, the LWE instance management unit 230 may determine whether the point in time at which the request is received from the first device is beyond a predetermined period of time from the point in time of the production of the LWE instance that is included in the reuse tag of the target extended LWE, and in the case that the point in time of the reception falls within the predetermined period of time from the point in time of the production, the LWE instance management unit 230 may determine that the LWE instance included in the target extended LWE instance is an available LWE instance.

According to an embodiment, the LWE instance management unit 230 may match the counter values respectively for one or more stored extended LWE instances and the one or more stored extended LWE instances, respectively, and may store the same. In this instance, a counter value may be a value indicating the number of times that an LWE instance included in an extended LWE instance is capable of being used or has been used.

In this instance, the LWE instance management unit 230 may determine whether the LWE instance included in the target extended LWE instance is available based on the counter value of the target extended LWE instance identified based on the request received from the first user device.

Specifically, in the case that a new extended LWE instance is received from one of the plurality of user devices 130 and 150, the LWE instance management unit 230 may set the counter value for the received extended LWE instance to a predetermined maximum value and may store the same, and may reduce the counter value by a predetermined value (e.g., 1) every time that the LWE instance included in the corresponding extended LWE instance is provided to one of the plurality of user devices 130 and 150. In this instance, in the case that the counter value of the target extended LWE instance identified based on the request received from the first user device is not 0, the LWE instance management unit 230 may determine that the LWE instance included in the corresponding target extended LWE instance is available. In addition, according to an embodiment, after reducing the counter value of the target extended LWE instance, the LWE instance management unit 230 may delete the corresponding target extended LWE instance in the case that the reduced count value is 0.

As another example, in the case that a new extended LWE instance is received from one of the plurality of user devices 130 and 150, the LWE instance management unit 230 may set the counter value for the received extended LWE instance to a predetermined default value (e.g., 0) and may store the same, and may increase the counter value by a predetermined value (e.g., 1) every time that the LWE instance included in the corresponding extended LWE instance is provided to one of the plurality of user devices 130 and 150. In this instance, the LWE instance management unit 230 may determine that the LWE instance included in the corresponding extended LWE instance is available in the case that the counter value of the extended LWE instance identified based on the request received from the first user device is not the predetermined maximum value. In addition, according to an embodiment, after increasing the counter value of the target extended LWE instance, in the case that the increased count value is the predetermined maximum value, the LWE instance management unit 230 may delete the corresponding target extended LWE instance.

According to an embodiment, in the case that a target extended LWE instance is not identified among the one or more stored extended LWE instances, or the LWE instance included in the identified target extended LWE is determined as being unavailable, the LWE instance management unit 230 may transmit, to the first device, a response indicating that the LWE instance that the first device requests is not present. In this instance, the first device may request an LWE instance from the second device, and the second device may produce a new LWE instance and may provide the produced LWE instance to the first device in response to the request from the first device, and may provide a new extended LWE instance including the produced LWE instance and a reuse tag associated with the produced LWE instance to the LWE instance management apparatus 200.

Figure 13:
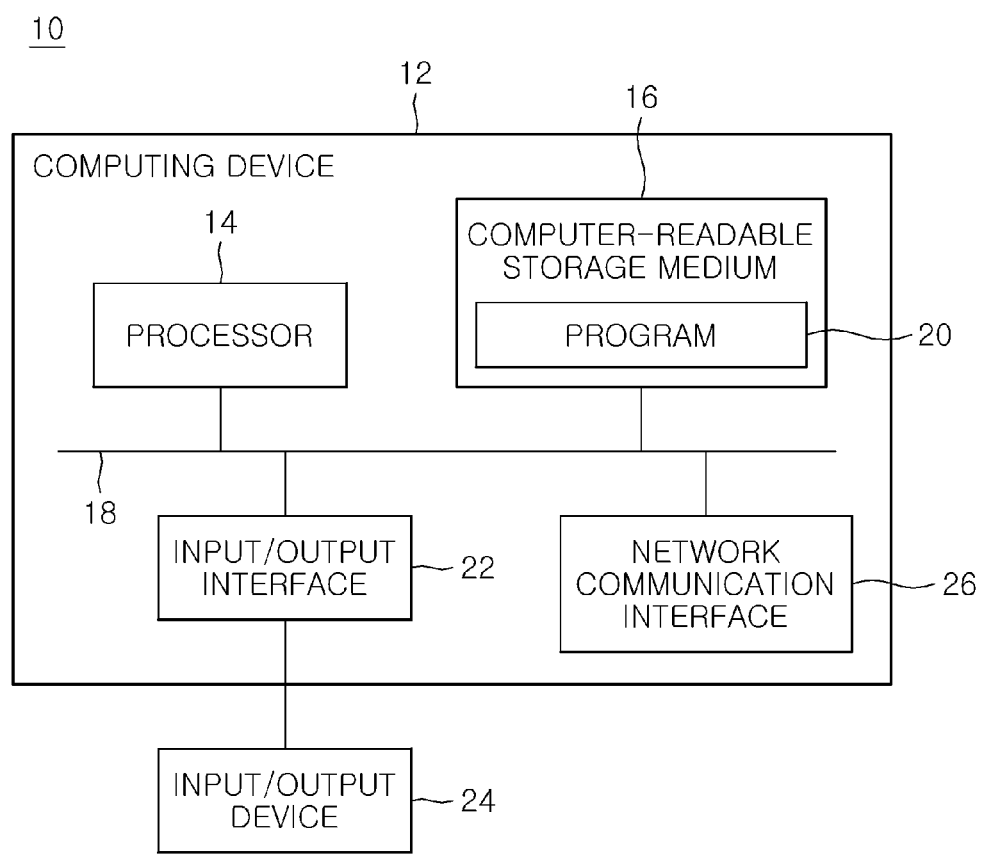
FIG. 13 is a block diagram illustrating an example of a computing environment including a computing device according to an embodiment.

In addition, according to an embodiment, the LWE instance management apparatus 200 may be embodied by including a computing device with reference to FIG. 13 and a description related to FIG. 13 provided below. For example, the LWE instance management apparatus 200 may include a processor 14, and the processor 14 may perform instructions configured to implement operations for managing an LWE instance so as to manage the LWE instance.

Figure 3:
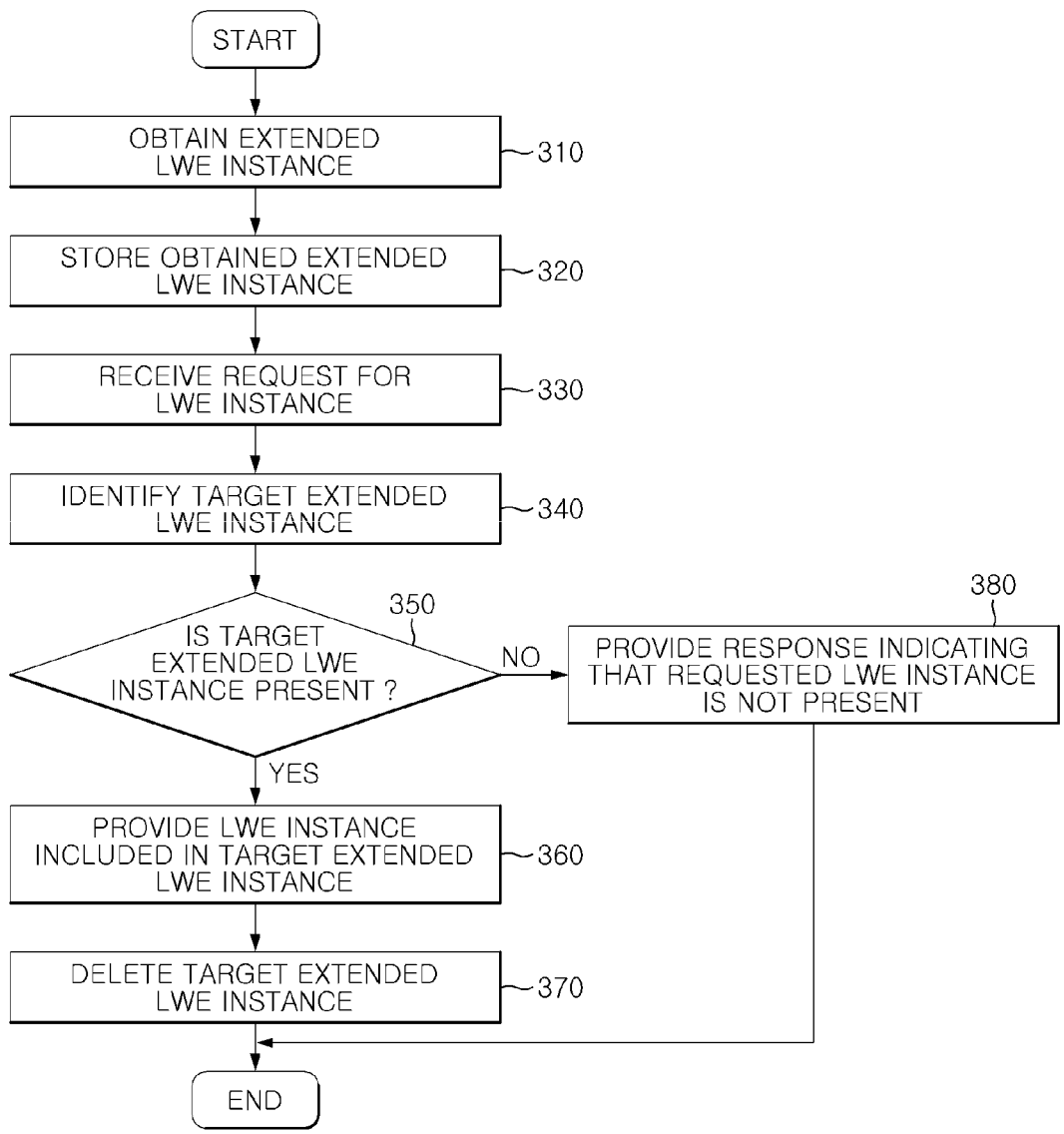
FIG. 3 is a flowchart illustrating an LWE instance management method according to an embodiment.

FIG. 3 is a flowchart illustrating an LWE instance management method according to an embodiment.

The method of FIG. 3 may be performed by, for example, the LWE instance management apparatus 200 illustrated in FIG. 2, and furthermore, the LWE instance management apparatus 200 may be embodied by including a computing device with reference to FIG. 13 and a description related to FIG. 13 provided below. For example, the LWE instance management apparatus 200 may include the processor 14, and the processor 14 may perform instructions configured to implement operations for managing an LWE instance so as to manage the LWE instance.

Referring to FIG. 3, the LWE instance management apparatus 200 may obtain one or more extended LWE instances from one or more user devices among the plurality of user devices 130 and 150 in operation 310.

Subsequently, the LWE instance management apparatus 200 store the one or more obtained extended LWE instances in operation 320.

Subsequently, the LWE instance management apparatus 200 may receive, from a first device among the plurality of user devices 130 and 150, a request for an LWE instance produced by a second device among the plurality of user devices 130 and 150 in operation 330.

Subsequently, the LWE instance management apparatus 200 may identify, based on a reuse tag included in each of the one or more stored extended LWE instances, a target extended LWE instance including an LWE instance produced by the second device among the one or more stored extended LWE instances in operation 340.

In this instance, according to an embodiment, the request received from the first device in operation 330 may include owner identification information associated with an owner of secret information corresponding to the LWE instance requested, and the LWE instance management apparatus 200 may identify an extended LWE instance of which the reuse tag includes owner identification information that is identical to the owner identification information included in the request received from the first device, as the target extended LWE instance among the one or more stored extended LWE instances.

Subsequently, in the case that the target extended LWE instance is identified, the LWE instance management apparatus 200 may provide the identified target extended LWE instance to the first device in operations 350 and 360, and may delete the identified target extended LWE instance in operation 370.

Conversely, in the case that the target extended LWE instance is not identified, the LWE instance management apparatus 200 may provide, to the first device, a response indicating that the LWE instance that the first device requests is not present in operations 350 and 380.

At least some operations in the flowchart of FIG. 3 may be performed in a different order, may be performed with other operations in combination, may be omitted, may be performed in detailed steps, or may be performed with one or more additional steps which are not illustrated.

Figure 4:
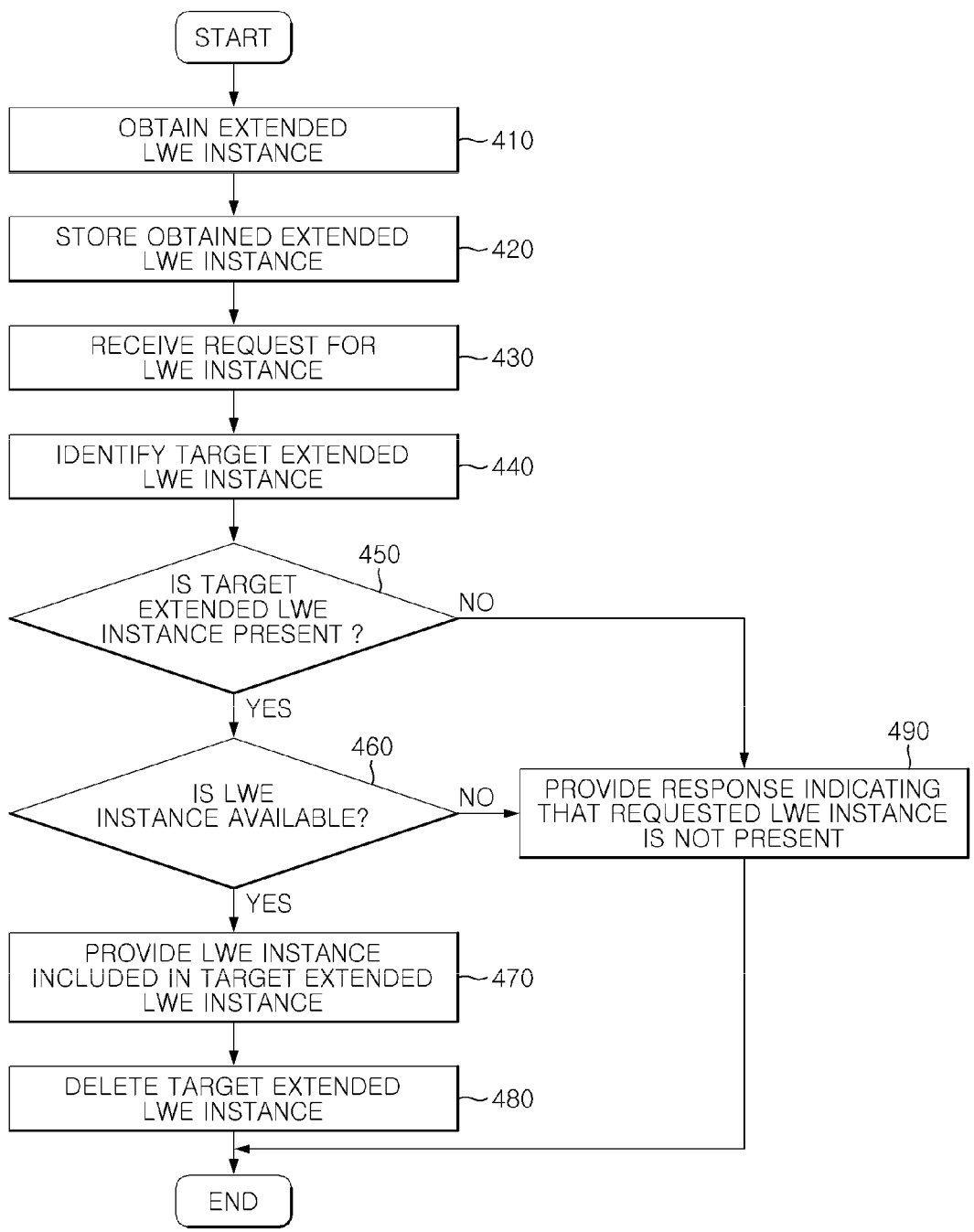
FIG. 4 is a flowchart illustrating an LWE instance management method according to an embodiment.

FIG. 4 is a flowchart illustrating an LWE instance management method according to an embodiment.

The method of FIG. 4 may be performed by, for example, the LWE instance management apparatus 200 illustrated in FIG. 2, and furthermore, the LWE instance management apparatus 200 may be embodied by including a computing device with reference to FIG. 13 and a description related to FIG. 13 provided below. For example, the LWE instance management apparatus 200 may include the processor 14, and the processor 14 may perform instructions configured to implement operations for managing an LWE instance so as to manage the LWE instance.

Referring to FIG. 4, the LWE instance management apparatus 200 may obtain one or more extended LWE instances from one or more user devices among the plurality of user devices 130 and 150 in operation 410.

Subsequently, the LWE instance management apparatus 200 stores the one or more obtained extended LWE instances in operation 420.

Subsequently, the LWE instance management apparatus 200 may receive, from a first device among the plurality of user devices 130 and 150, a request for an LWE instance produced by a second device among the plurality of user devices 130 and 150 in operation 430.

Subsequently, the LWE instance management apparatus 200 may identify, based on a reuse tag included in each of the one or more stored extended LWE instances, a target extended LWE instance including an LWE instance produced by the second device among the one or more stored extended LWE instances in operation 440.

In this instance, according to an embodiment, the request received from the first device in operation 430 may include owner identification information associated with an owner of secret information corresponding to the LWE instance requested, and the LWE instance management apparatus 200 may identify an extended LWE instance of which the reuse tag includes owner identification information that is identical to the owner identification information included in the request received from the first device, as a target extended LWE instance among the one or more stored extended LWE instances.

Subsequently, in the case that the target extended LWE instance is identified in operation 450, the LWE instance management apparatus 200 may determine whether the LWE instance included in the target extended LWE instance is an available LWE instance in operation 460.

In this instance, according to an embodiment, the reuse tag included in the target extended LWE instance may include information associated with the point in time of production of the LWE instance included in the target extended LWE instance, and the LWE instance management apparatus 200 may determine, based on the point in time of the production of the LWE instance included in the target extended LWE instance, whether the LWE instance included in the target extended LWE instance is available.

As a detailed example, the LWE instance management apparatus 200 determines whether the point in time at which the request is received from the first device is beyond a predetermined period of time from the point in time at which the LWE instance included in the identified target extended LWE is produced, and in the case that the point in time of the reception falls within the predetermined period of time, the LWE instance management apparatus 200 may determine the corresponding LWE instance as an available LWE instance. In the case that the point in time of the reception is beyond the predetermined period of time, the LWE instance management apparatus 200 may determine the corresponding LWE instance as an unavailable LWE instance.

In the case that the LWE instance included in the target extended LWE instance is an available instance, the LWE instance management apparatus 200 may provide the LWE instance included in the target extended LWE instance to the first device in operation 470, and may delete the corresponding target extended LWE instance in operation 480.

Conversely, in the case that a target extended LWE instance is not identified, or the LWE instance included in the target extended LWE instance is determined as an unavailable LWE instance, the LWE instance management apparatus 200 may provide, to the first device, a response indicating that the LWE instance that the first device requests is not present in operation 490.

At least some operations in the flowchart of FIG. 4 may be performed in a different order, may be performed with other operations in combination, may be omitted, may be performed in detailed steps, or may be performed with one or more additional steps which are not illustrated.

Figure 5:
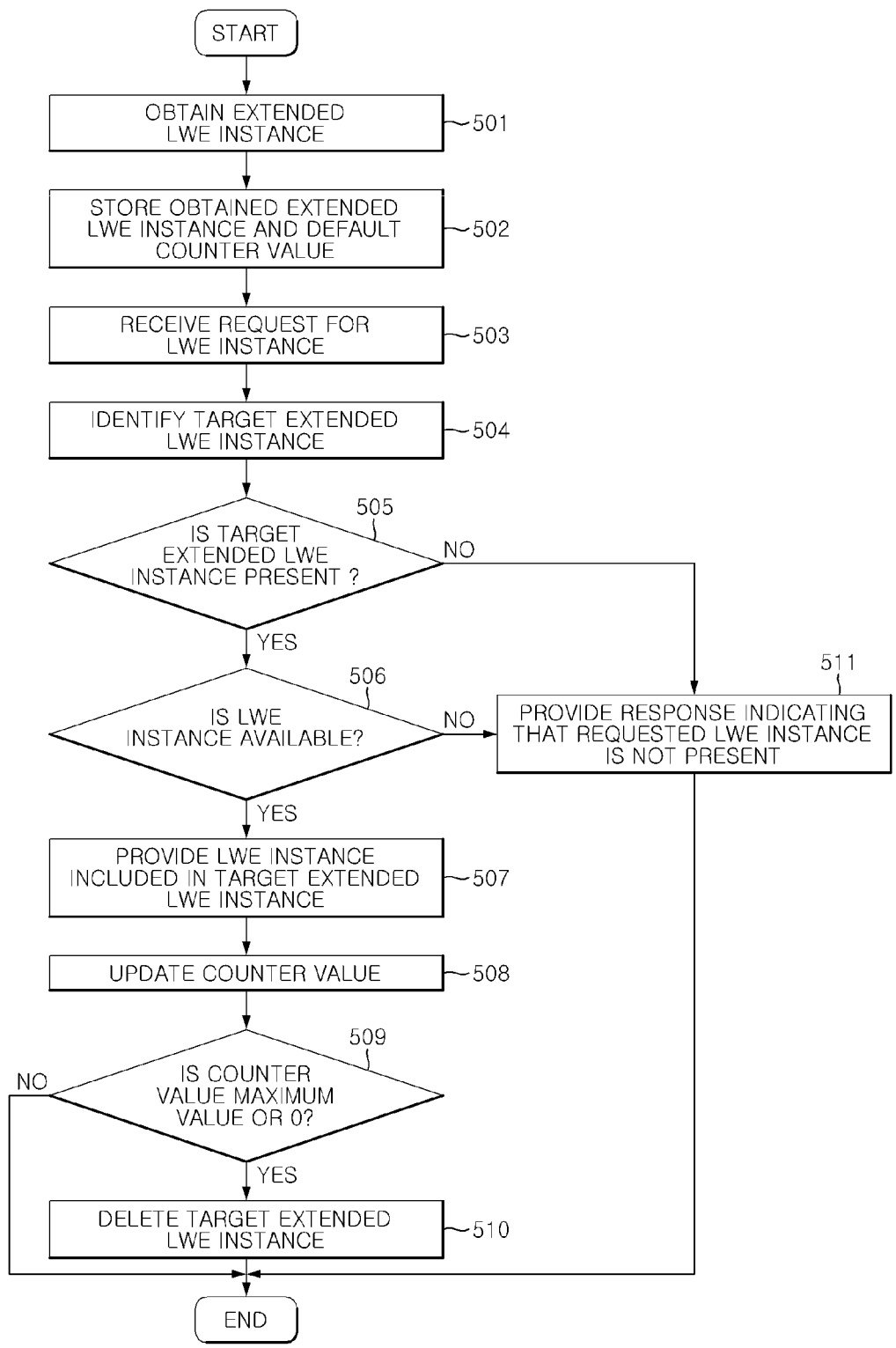
FIG. 5 is a flowchart illustrating an LWE instance management method according to an embodiment.

FIG. 5 is a flowchart illustrating an LWE instance management method according to an embodiment.

The method of FIG. 5 may be performed by, for example, the LWE instance management apparatus 200 illustrated in FIG. 2, and furthermore, the LWE instance management apparatus 200 may be embodied by including a computing device with reference to FIG. 13 and a description related to FIG. 13 provided below. For example, the LWE instance management apparatus 200 may include the processor 14, and the processor 14 may perform instructions configured to implement operations for managing an LWE instance so as to manage the LWE instance.

Referring to FIG. 5, the LWE instance management apparatus 200 may obtain one or more extended LWE instances from one or more user devices among the plurality of user devices 130 and 150 in operation 501.

Subsequently, the LWE instance management apparatus 200 may store one or more obtained extended LWE instances and the counter value for each of the one or more extended LWE instances in operation 502.

In this instance, according to an embodiment, the counter value may be set to a predetermined maximum value or 0, as a default value.

Subsequently, the LWE instance management apparatus 200 may receive, from a first device among the plurality of user devices 130 and 150, a request for an LWE instance produced by a second device among the plurality of user devices 130 and 150 in operation 503.

Subsequently, the LWE instance management apparatus 200 may identify, based on a reuse tag included in each of the one or more stored extended LWE instances, a target extended LWE instance including an LWE instance produced by the second device among the one or more stored extended LWE instances in operation 504.

In this instance, according to an embodiment, the request received from the first device in operation 503 may include owner identification information associated with an owner of secret information corresponding to the LWE instance requested, and the LWE instance management apparatus 200 may identify an extended LWE instance of which the reuse tag includes owner identification information that is identical to the owner identification information included in the request received from the first device, as a target extended LWE instance among the one or more stored extended LWE instances.

Subsequently, in the case that the target extended LWE instance is identified in operation 505, the LWE instance management apparatus 200 may determine, based on the counter value for the target extended LWE instance, whether the LWE instance included in the target extended LWE instance is an available LWE instance in operation 506.

In this instance, according to an embodiment, in the case that the default counter value is set to the predetermined maximum value, the LWE instance management apparatus 200 may determine whether the counter value for the target extended LWE instance is 0, and may determine that the LWE instance included in the target extended LWE instance is an available LWE instance in the case that the counter value is not 0.

Conversely, in the case that the default counter value is set to 0, the LWE instance management apparatus 200 may determine whether the counter value for the target extended LWE instance is the predetermined maximum value, and may determine that the LWE instance included in the target extended LWE instance is an available LWE instance in the case that the counter value is not the maximum value.

In the case that the LWE instance included in the target extended LWE instance is an available instance, the LWE instance management apparatus 200 may provide the LWE instance included in the target extended LWE instance to the first device in operation 507, and may update the counter value of the corresponding target extended LWE instance in operation 508.

In this instance, according to an embodiment, in the case that the default counter value is set to the predetermined maximum value, the LWE instance management apparatus 200 may reduce the counter value for the target extended LWE instance by a predetermined value.

Conversely, in the case that the default counter value is set to 0, the LWE instance management apparatus 200 may increase the counter value for the target extended LWE instance by a predetermined value.

Subsequently, in the case that the updated counter value is the predetermined maximum value or 0, the LWE instance management apparatus 200 may delete the target extended LWE instance in operations 509 and 510.

Specifically, according to an embodiment, in the case that the default counter value is set to the predetermined maximum value, the LWE instance management apparatus 200 may determine that the LWE instance included in the target extended LWE instance is not available any longer in the case that the updated counter value of the target extended LWE instance is 0, and may delete the target extended LWE instance.

Conversely, in the case that the default counter value is set to a predetermined value of 0, the LWE instance management apparatus 200 may determine that the LWE instance included in the target extended LWE instance is not available any longer in the case that the updated counter value of the target extended LWE instance is the predetermined maximum value, and may delete the target extended LWE instance.

In the case that a target extended LWE instance is not identified, or the LWE instance included in the target extended LWE instance is determined as an unavailable LWE instance, the LWE instance management apparatus 200 may provide, to the first device, a response indicating that the LWE instance that the first device requests is not present in operation 511.

At least some operations in the flowchart of FIG. 5 may be performed in a different order, may be performed with other operations in combination, may be omitted, may be performed in detailed steps, or may be performed with one or more additional steps which are not illustrated.

Figure 6:
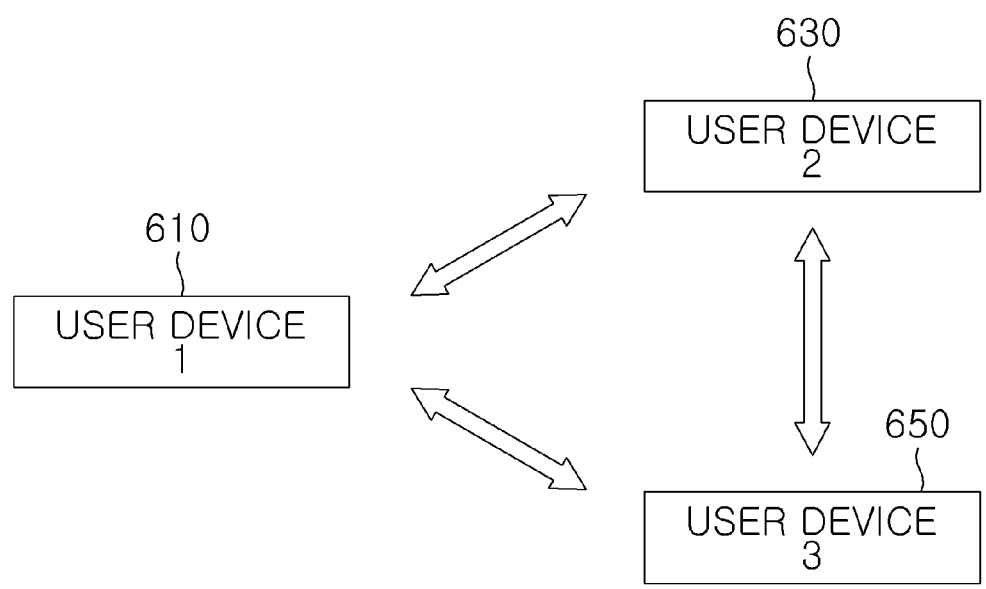
FIG. 6 is a diagram illustrating the configuration of an LWE instance management system according to an embodiment.

FIG. 6 is a diagram illustrating the configuration of an LWE instance management system according to an embodiment.

Referring to FIG. 6, an LWE instance management system 100 according to an embodiment may include a plurality of user devices 610, 630, and 650.

Each of the plurality of user devices 610, 630, and 650 may be a device for performing an operation using an LWE instance, and may be, for example, a smart phone, a tablet PC, a desktop PC, a laptop PC, a phablet, a smart watch, or the like, but is not necessarily limited to a device in a predetermined form.

Each of the plurality of user devices 610, 630, and 650 may obtain an LWE instance and one or more extended LWE instances including reuse tags associated with LWE instances from at least one of different user devices, may store the same, and may perform an operation using an LWE instance included in one of the one or more stored extended LWE instances.

Figure 7:
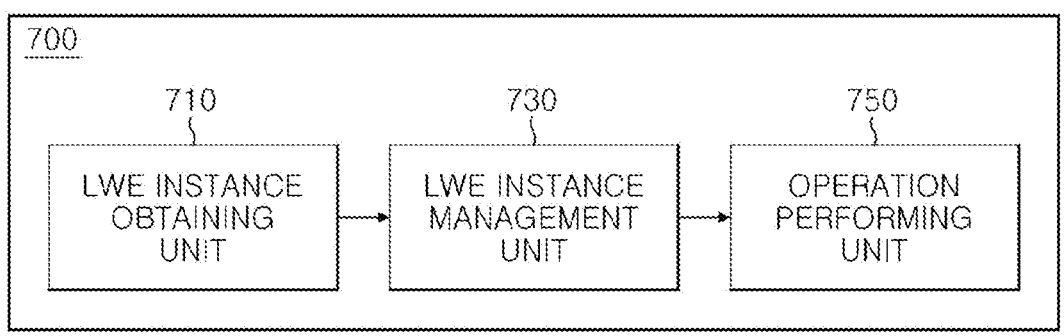
FIG. 7 is a diagram illustrating the configuration of an LWE instance management apparatus according to an embodiment.

FIG. 7 is a diagram illustrating the configuration of an LWE instance management apparatus according to an embodiment.

An LWE instance management apparatus 700 illustrated in FIG. 7 may be, for example, a component included in the user devices 610, 630, and 650 illustrated in FIG. 6.

Hereinafter, for ease of description, although a description is provided on the assumption that the LWE instance management apparatus 700 is a component included in the user device 610, the disclosure is not necessarily limited thereto.

Referring to FIGS. 6 and 7, the LWE instance management apparatus 700 according to an embodiment may include an LWE instance obtaining unit 710, an LWE instance management unit 730, and an operation performing unit 750.

The LWE instance obtaining unit 710 may obtain an LWE instance and one or more extended LWE instances including reuse tags of LWE instances from one or more user devices among the plurality of user devices 630 and 650.

The LWE instance management unit 730 may store one or more extended LWE instances obtained by the LWE instance obtaining unit 710. In addition, based on a reuse tag included in each of the one or more stored extended LWE instances, the LWE instance management unit 730 may identify a target extended LWE instance, including an LWE instance produced by a first device among the plurality of user devices 630 and 650, among the one or more stored extended LWE instances. In addition, the operation performing unit 750 may perform an operation using the LWE instance included in the identified target extended LWE instance.

According to an embodiment, after performing an operation using the LWE instance included in the target extended LWE instance, the LWE instance management unit 730 may delete the corresponding target extended LWE instance.

According to an embodiment, based on owner identification information included in a reuse tag of each of the one or more stored extended LWE instances, the LWE instance management unit 730 may identify a target extended LWE instance. For example, the LWE instance management unit 730 may identify an extended LWE instance of which the reuse tag includes owner identification information that is identical to owner identification information of secret information associated with the LWE instance produced by the first device as a target extended LWE instance.

According to an embodiment, in the case that the point in time at which the LWE instance is produced is included in a reuse tag, the LWE instance management unit 730 may identify a target extended LWE instance, and based on the point in time at which an LWE instance included in the identified target extended LWE instance is produced, may determine whether the LWE instance included in the identified target extended LWE instance is available. In addition, in the case that the LWE instance included in the target extended LWE instance is identified as an available LWE instance, the operation performing unit 750 may perform an operation using the LWE instance included in the target extended LWE instance.

Specifically, the LWE instance management unit 730 may determine whether the present point is beyond a predetermined period of time from the point in time of the production of the LWE instance included in the reuse tag of the identified target extended LWE, and in the case that the present point falls within the predetermined period of time from the point in time of the production, the LWE instance management unit 730 may determine that the LWE instance included in the identified target extended LWE instance is an available LWE instance.

According to an embodiment, the LWE instance management unit 730 may match the counter values for LWE instances respectively included in the one or more stored extended LWE instances and the one or more extended LWE instances, respectively, and may store the same. In this instance, a counter value may be a value indicating the number of times that an LWE instance included in an extended LWE instance is capable of being used or has been used.

In this instance, the LWE instance management unit 730 may determine, based on the counter value of the identified target extended LWE instance, whether the LWE instance included in the identified target extended LWE instance is available.

Specifically, in the case that a new extended LWE instance is received from one of the plurality of user devices 630 and 650, the LWE instance management unit 730 may set a counter value for the received extended LWE instance to a predetermined maximum value and may store the same, and may decrease the counter value by a predetermined value (e.g., 1) every time that an operation is performed using the LWE instance included in the corresponding extended LWE instance. In this instance, the LWE instance management unit 730 may determine that the LWE instance included in the corresponding target extended LWE instance is available in the case that the counter value of the identified target extended LWE instance is not 0. In addition, according to an embodiment, after reducing the counter value of the target extended LWE instance, in the case that the reduced count value is 0, the LWE instance management 730 may delete the corresponding target extended LWE instance.

As another example, in the case that a new extended LWE instance is received from one of the plurality of user devices 630 and 650, the LWE instance management unit 730 may set a counter value for the received extended LWE instance to a predetermined default value (e.g., 0) and may store the same, and may increase the counter value by a predetermined value (e.g., 1) every time that an operation is performed using an LWE instance included in the corresponding extended LWE instance. In this instance, the LWE instance management unit 730 may determine that the LWE instance included in the corresponding target extended LWE instance is available in the case that the counter value of the identified target extended LWE instance is not the predetermined maximum value. In addition, according to an embodiment, after increasing the counter value of the target extended LWE instance, the LWE instance management unit 730 may delete the corresponding target extended LWE instance in the case that the increased count value is the predetermined maximum value.

According to an embodiment, in the case that a target extended LWE instance produced by the first device is not identified among the one or more stored extended LWE instances, or the LWE instance included in the identified target extended LWE is determined as being unavailable, the LWE instance management unit 730 may request the first device to provide an LWE instance. In this instance, the first device may produce a new LWE instance, and may provide the produced LWE instance and an extended LWE instance including a reuse tag associated with the produced LWE instance to the LWE instance management apparatus 700.

In addition, according to an embodiment, the LWE instance management apparatus 700 may be an apparatus for managing an LWE instance by including the processor 14, as described with reference to FIG. 13 and a description provided below with reference to FIG. 13. The processor 14 may execute an instruction configured to implement a predetermined operation for managing an LWE instance, and the predetermined operation may include operations of the above-described LWE instance obtaining unit 710, the LWE instance management unit 730, and the operation performing unit 750.

Figure 8:
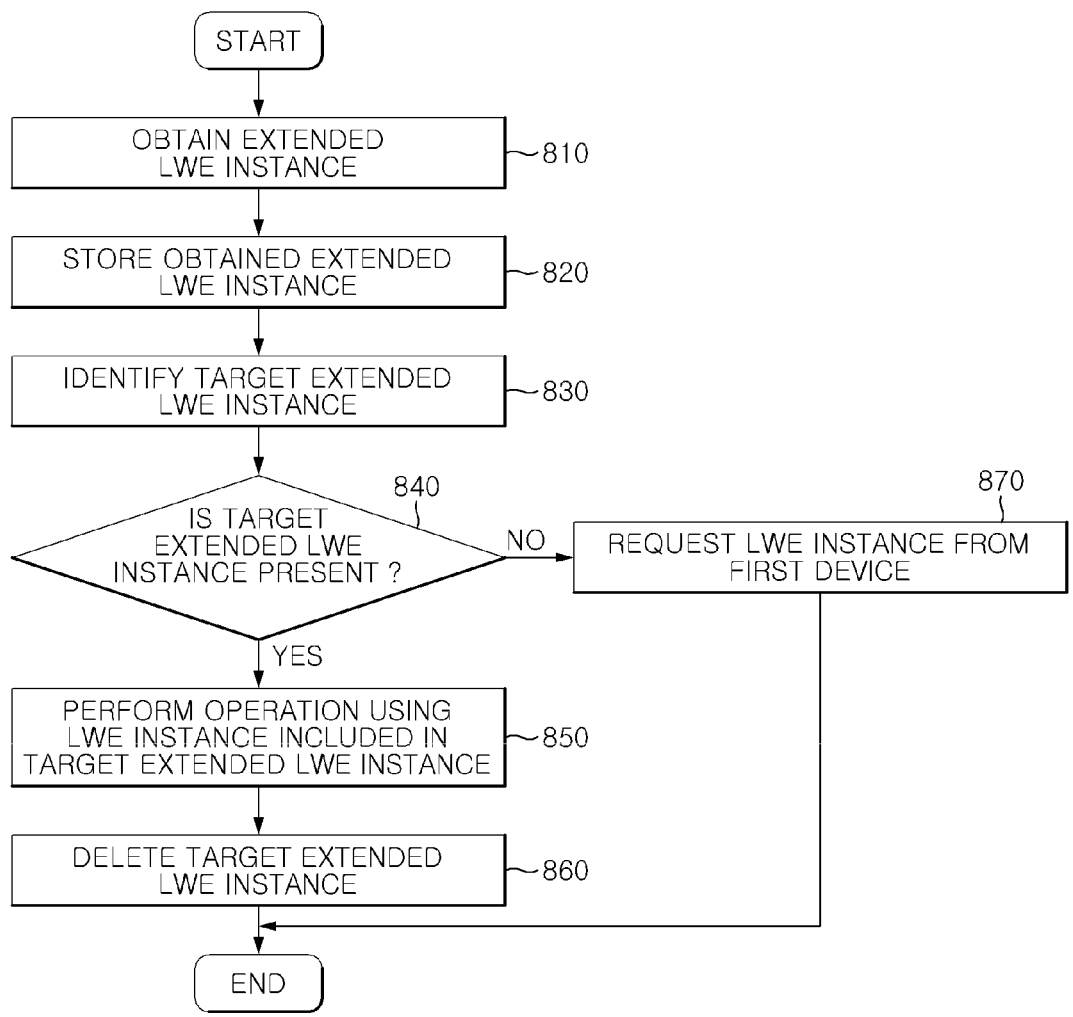
FIG. 8 is a flowchart illustrating an LWE instance management method according to an embodiment.

FIG. 8 is a flowchart illustrating an LWE instance management method according to an embodiment.

The method of FIG. 8 may be performed by, for example, the LWE instance management apparatus 700 illustrated in FIG. 7, and furthermore, the LWE instance management apparatus 700 may be embodied by including a computing device with reference to FIG. 13 and a description related to FIG. 13 provided below. For example, the LWE instance management apparatus 700 may include the processor 14, and the processor 14 may perform instructions configured to implement operations for managing an LWE instance so as to manage the LWE instance.

Referring to FIG. 8, the LWE instance management apparatus 700 may obtain one or more extended LWE instances from one or more user devices among the plurality of user devices 630 and 650 in operation 810.

Subsequently, the LWE instance management apparatus 700 stores the one or more obtained extended LWE instances in operation 820.

Subsequently, based on a reuse tag included in each of the one or more extended LWE instances, the LWE instance management apparatus 700 may identify a target extended LWE instance, including an LWE instance produced by a first device among the plurality of user devices 630 and 650, among the one or more extended LWE instances in operation 830.

According to an embodiment, the LWE instance management apparatus 700 may identify a target extended LWE instance based on owner identification information included in a reuse tag of each of the one or more stored extended LWE instances.

Subsequently, in the case that the target extended LWE instance is identified in operation 840, the LWE instance management apparatus 700 may perform an operation using an LWE instance included in the identified target extended LWE instance in operation 850, and may delete the identified target extended LWE instance in operation 860.

Conversely, in the case that a target extended LWE instance is not identified in operation 840, the LWE instance management apparatus 700 may request the first device to provide an LWE instance in operation 870.

At least some operations in the flowchart of FIG. 8 may be performed in a different order, may be performed with other operations in combination, may be omitted, may be performed in detailed steps, or may be performed with one or more additional steps which are not illustrated.

Figure 9:
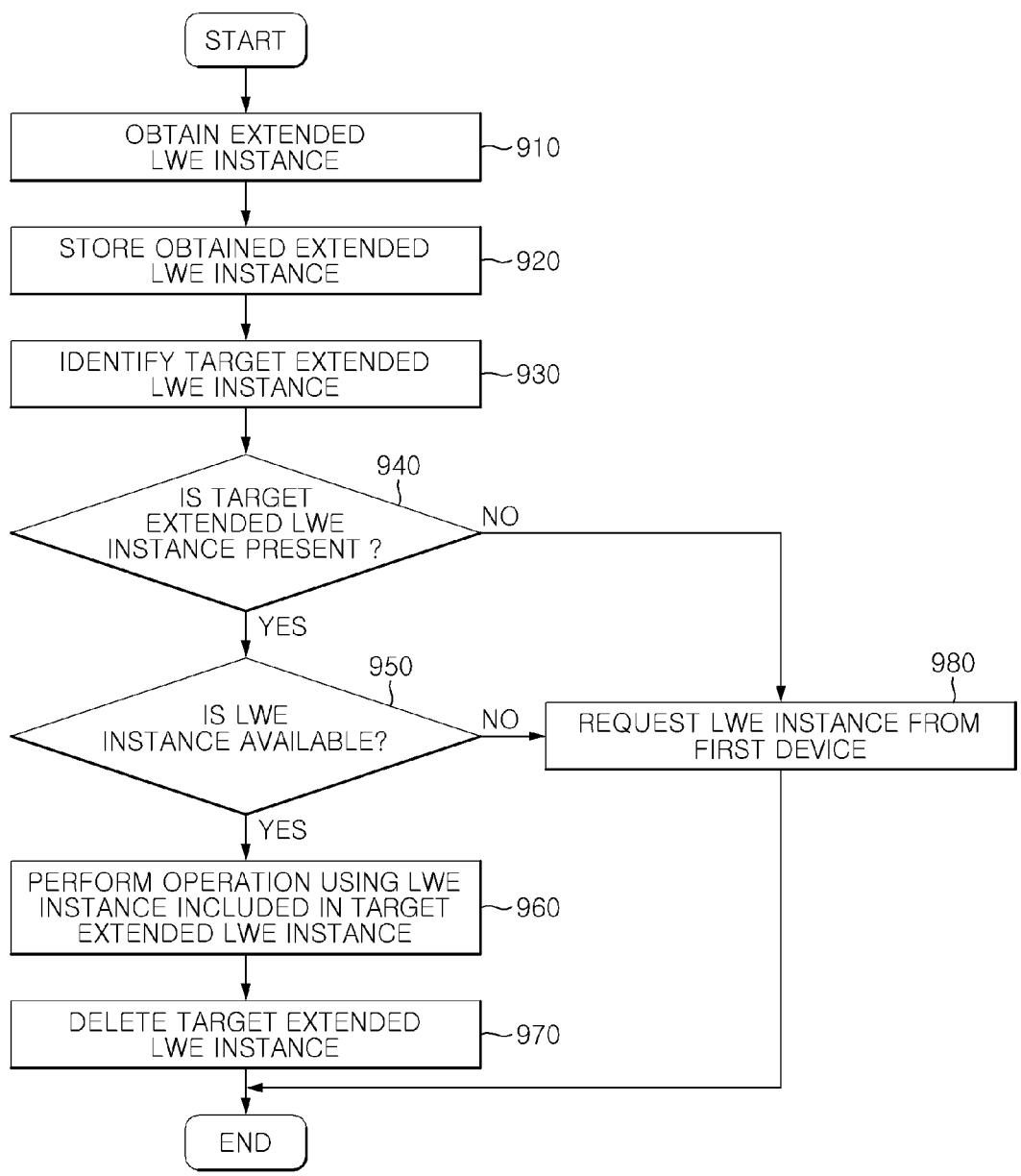
FIG. 9 is a flowchart illustrating an LWE instance management method according to an embodiment.

FIG. 9 is a flowchart illustrating an LWE instance management method according to an embodiment.

The method of FIG. 9 may be performed by, for example, the LWE instance management apparatus 700 illustrated in FIG. 7, and furthermore, the LWE instance management apparatus 700 may be embodied by including a computing device with reference to FIG. 13 and a description related to FIG. 13 provided below. For example, the LWE instance management apparatus 700 may include the processor 14, and the processor 14 may perform instructions configured to implement operations for managing an LWE instance so as to manage the LWE instance.

Referring to FIG. 9, the LWE instance management apparatus 700 may obtain one or more extended LWE instances from one or more user devices among the plurality of user devices 630 and 650 in operation 910.

Subsequently, the LWE instance management apparatus 700 stores the one or more obtained extended LWE instances in operation 920.

Subsequently, based on a reuse tag included in each of the one or more stored extended LWE instances, the LWE instance management apparatus 700 may identify a target extended LWE instance, including an LWE instance produced by a first device among the plurality of user devices 630 and 650, among the one or more stored extended LWE instances in operation 930.

According to an embodiment, the LWE instance management apparatus 700 may identify a target extended LWE instance based on owner identification information included in a reuse tag of each of the one or more stored extended LWE instances.

Subsequently, in the case that the target extended LWE instance is identified in operation 940, the LWE instance management apparatus 700 may determine whether an LWE instance included in the target extended LWE instance is an available LWE instance in operation 950.

According to an embodiment, the reuse tag included in the target extended LWE instance may include information associated with the point in time of production of the LWE instance included in the target extended LWE instance, and the LWE instance management apparatus 700 may determine, based on the point in time of the production of the LWE instance included in the target extended LWE instance, whether the LWE instance included in the target extended LWE instance is available.

Specifically, the LWE instance management apparatus 700 may determine whether the present point is beyond a predetermined period of time from the point in time of the production of the LWE instance included in the identified target extended LWE, and in the case that the present point falls within the predetermined period of time, the LWE instance management apparatus 700 may determine that the LWE instance included in the target extended LWE instance is an available LWE instance.

In the case that the LWE instance included in the target extended LWE instance is an available instance, the LWE instance management apparatus 700 may perform an operation using the LWE instance included in the target extended LWE instance in operation 960, and may delete the corresponding target extended LWE instance in operation 970.

Conversely, in the case that a target extended LWE instance is not identified, or the LWE instance included in the target extended LWE instance is determined as an unavailable LWE instance, the LWE instance management apparatus 700 may request the first device to provide an LWE instance in operation 980.

At least some operations in the flowchart of FIG. 9 may be performed in a different order, may be performed with other operations in combination, may be omitted, may be performed in detailed steps, or may be performed with one or more additional steps which are not illustrated.

Figure 10:
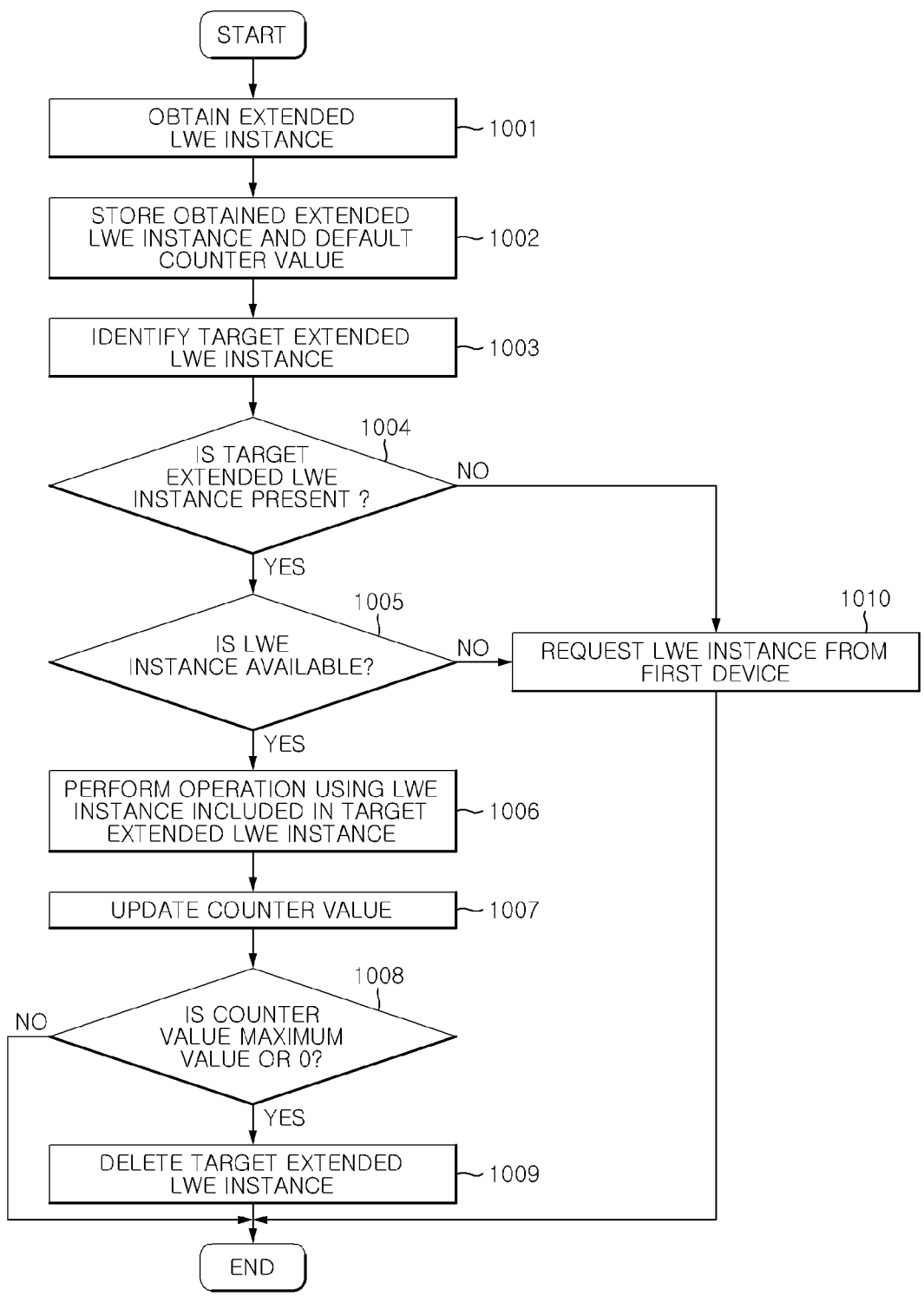
FIG. 10 is a flowchart illustrating an LWE instance management method according to an embodiment.

FIG. 10 is a flowchart illustrating an LWE instance management method according to an embodiment.

The method of FIG. 10 may be performed by, for example, the LWE instance management apparatus 700 illustrated in FIG. 7, and furthermore, the LWE instance management apparatus 700 may be embodied by including a computing device with reference to FIG. 13 and a description related to FIG. 13 provided below. For example, the LWE instance management apparatus 700 may include the processor 14, and the processor 14 may perform instructions configured to implement operations for managing an LWE instance so as to manage the LWE instance.

Referring to FIG. 10, the LWE instance management apparatus 700 may obtain one or more extended LWE instances from one or more user devices among the plurality of user devices 630 and 650 in operation 1001.

Subsequently, the LWE instance management apparatus 700 stores the one or more obtained extended LWE instances and the counter value for each of the one or more extended LWE instances in operation 1002.

In this instance, according to an embodiment, the counter value may be set to a predetermined maximum value or 0, as a default value.

Subsequently, based on a reuse tag included in each of the one or more stored extended LWE instances, the LWE instance management apparatus 700 may identify a target extended LWE instance, including an LWE instance produced by a first device among the plurality of user devices 630 and 650, among the one or more stored extended LWE instances in operation 1003.

According to an embodiment, based on owner identification information included in a reuse tag of each of the one or more stored extended LWE instances, the LWE instance management apparatus 700 may identify a target extended LWE instance.

Subsequently, in the case that the target extended LWE instance is identified in operation 1004, the LWE instance management apparatus 700 may determine, based on the counter value for the target extended LWE instance, whether the LWE instance included in the target extended LWE instance is an available LWE instance in operation 1005.

Specifically, according to an embodiment, in the case that the default counter value is set to the predetermined maximum value, the LWE instance management apparatus 700 may determine whether the counter value for the target extended LWE instance is 0, and may determine that the LWE instance included in the target extended LWE instance is an available LWE instance in the case that the counter value is not 0.

Conversely, in the case that the default counter value is set to 0, the LWE instance management apparatus 700 may determine whether the counter value for the target extended LWE instance is the predetermined maximum value, and may determine that the LWE instance included in the target extended LWE instance is an available LWE instance in the case that the counter value is not the maximum value.

In the case that the LWE instance included in the target extended LWE instance is an available instance, the LWE instance management apparatus 700 may perform an operation using the LWE instance included in the target extended LWE instance in operation 1006, and may update the counter value of the corresponding target extended LWE instance in operation 1007.

Specifically, according to an embodiment, in the case that the default counter value is set to the predetermined maximum value, the LWE instance management apparatus 700 may reduce the counter value for the target extended LWE instance by a predetermined value.

Conversely, in the case that the default counter value is set to 0, the LWE instance management apparatus 700 may increase the counter value for the target extended LWE instance by a predetermined value.

Subsequently, in the case that the updated counter value is the maximum value or 0, the LWE instance management apparatus 700 may delete the target extended LWE instance in operations 1008 and 1009.

Specifically, according to an embodiment, in the case that the default counter value is set to the predetermined maximum value, the LWE instance management apparatus 700 may determine that the LWE instance included in the target extended LWE instance is not available any longer in the case that the updated counter value of the target extended LWE instance is 0, and may delete the target extended LWE instance.

Conversely, in the case that the default counter value is set to a predetermined value of 0, the LWE instance management apparatus 700 may determine that the LWE instance included in the target extended LWE instance is not available any longer in the case that the updated counter value of the target extended LWE instance is the predetermined maximum value, and may delete the target extended LWE instance.

Conversely, in the case that a target extended LWE instance is not identified, or the LWE instance included in the target extended LWE instance is determined as an unavailable LWE instance, the LWE instance management apparatus 700 may request the first device to provide an LWE instance in operation 1010.

At least some operations in the flowchart of FIG. 10 may be performed in a different order, may be performed with other operations in combination, may be omitted, may be performed in detailed steps, or may be performed with one or more additional steps which are not illustrated.

Figure 11:
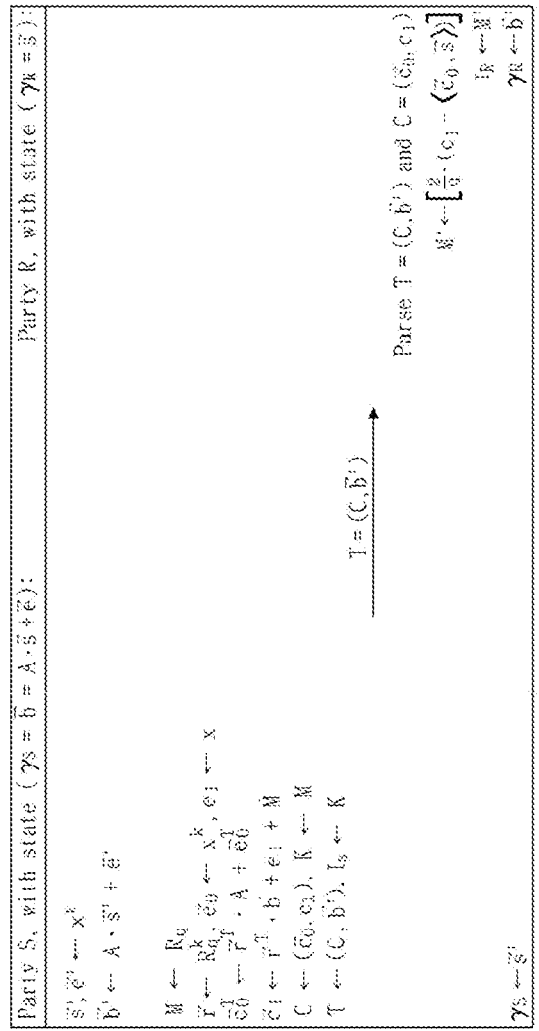
FIG. 11 is a diagram illustrating an example of an LWE problem-based continuous key agreement algorithm.
Figure 12:
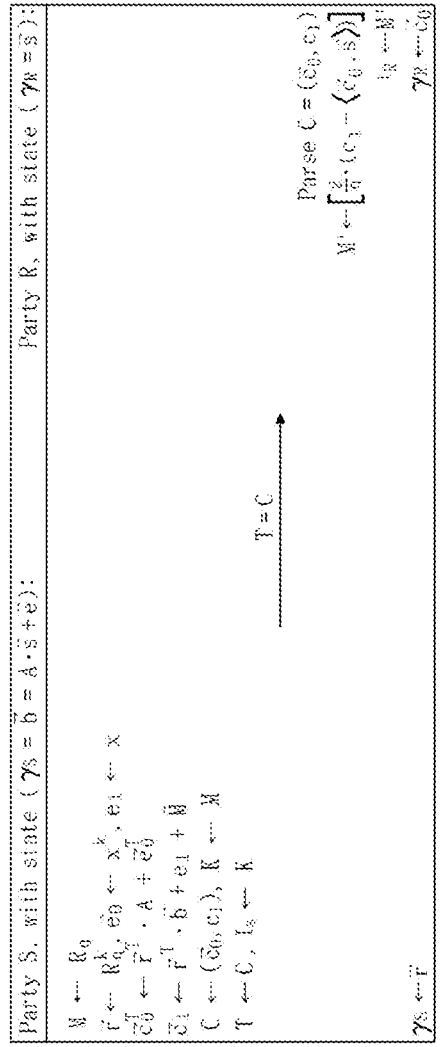
FIG. 12 is a diagram illustrating an example of an algorithm modified from the continuous key agreement algorithm illustrated in FIG. 11 so that an LWE instance management method according to an embodiment is applied.

FIG. 11 is a diagram illustrating an example of an LWE problem-based continuous key agreement algorithm, and FIG. 12 is a diagram illustrating an example of an algorithm modified from the continuous key agreement algorithm illustrated in FIG. 11 so that an LWE instance management method according to an embodiment is applied.

Referring to FIGS. 11 and 12, in the example of FIG. 12, an LWE instance $\vec{b}'=A^T \cdot \vec{s}+\vec{e}$ production process illustrated in FIG. 11 is omitted, and Party S that is a message sender transmits only cryptogram C associated with message M to Party R that is a message receiver. In addition, Party S provides an extended LWE instance including an LWE instance $(A^T, \vec{c}_0 = A^T \cdot \vec{r} + \vec{e}_0)$ and a reuse tag to the LWE instance management apparatus 200 and 700, and may update a state with $\gamma_s = \vec{r}$.

In addition, Party R that is the message receiver decodes the cryptogram C received from Party S and obtains M', and may update the state with $\gamma_R = \vec{c}_0$ using the LWE instance $(A^T, \vec{c}_0 = A^T \cdot \vec{r} + \vec{e}_0)$ included in the extended LWE instance stored in the LWE instance management apparatus 200 and 700.

As shown in FIGS. 11 and 12, in the case that an LWE instance management method according to an embodiment of the present disclosure is used, the number of LWE instances needed for key agreement may be decreased from 2 to 1. Accordingly, Party S needs to transmit only cryptogram C to Party R and thus, the number of operations performed and the number of network transmission performed may be reduced.

FIG. 13 is a block diagram illustrating an example of a computing environment including a computing device according to an embodiment.

In the illustrated embodiments, the respective components may have different functions and capabilities, in addition to the functions and capability described below, and an additional component that is not described below may be included.

The illustrated computing environment 10 includes a computing device 12. The computing device 12 may be one or more components included in the LWE instance management apparatus 200 and 700 according to an embodiment.

The computing device 12 may include at least one processor 14, a computer-readable storage medium 16, and a communication bus 18. The processor 14 may enable the computing device 12 to operate according to the above-described embodiments. For example, the processor 14 may implement one or more programs stored in the computer-readable storage medium 16. The one or more programs may include one or more computer-executable instructions, and the computer-executable instructions may be configured to enable the computing device 12 to perform operations according to embodiments when the computer-executable instructions are executed by the processor 14.

The computer-readable storage medium 16 may be configured to store a computer-executable instruction or program code, program data, and/or other appropriate types of information. The program 20 stored in the computer-readable storage medium 16 may include a set of instructions executable by the processor 14. According to an embodiment, the computer-readable storage medium 16 may be memory (volatile memory such as a random access memory, non-volatile memory, or an appropriate combination thereof), one or more magnetic disc storage devices, optical disc storage devices, flash memory devices, and other types of storage media capable of storing information desired or accessed by the computing device 12, or an appropriate combination thereof.

The communication bus 18 may include the processor 14, the computer-readable storage medium 16, and may mutually connect to various other components of the computing device 12.

The computing device 12 may include one or more input/output interfaces 22 that provides an interface for one or more input/output devices 24, and one or more network communication interfaces 26. The input/output interface 22 and the network communication interface 26 may be connected to the communication bus 18. The input/output device 24 may be connected to other components of the computing device 12 via the input/output interface 22. The illustrated input/output device 24 may include a pointing device (a mouse, a trackpad, or the like), a keyboard, a touch input device (a touch pad, a touch screen, or the like), a voice or sound input device, various types of sensor devices, and/or an input device such as a shooting device, and/or an output device such as a display device, a printer, a speaker, and/or a network card. The illustrated input/output device 24 may be included in the computing device 12 as one of the components that constitute the computing device 12, or may be connected to the computing device 12 as a separate device from the computing device 12.

Although the present disclosure has been described in detail with reference to a representative embodiment, it would be apparent to those skilled in the art that various modifications can be made to the above-described embodiments without departing from the scope of the present disclosure. Therefore, the scope of the present disclosure cannot be determined merely based on the described embodiments. Rather, the scope of the present disclosure should be determined based on the accompanying claims and their equivalents.

What is claimed is:

1. A method of managing a learning with errors (LWE) instance, the method performed by a computing device comprising at least one processor and a computer-readable storage medium storing one or more programs executed by the at least one processor, the method comprising:
   obtaining, from one or more user devices among a plurality of user devices, one or more learning with errors (LWE) instances and one or more extended LWE instances each including a reuse tag associated with each of the one or more LWE instances;
   storing the one or more extended LWE instances;
   receiving, from a first device among the plurality of user devices, a request for an LWE instance produced by a second device among the plurality of user devices;

identifying, based on the reuse tag, a target extended LWE instance including the LWE instance produced by the second device among the one or more extended LWE instances; and
providing the LWE instance included in the target extended LWE instance to the first device.

2. The method of claim 1, further comprising:
after the providing, deleting the target extended LWE instance.

3. The method of claim 1, wherein the reuse tag comprises owner identification information of secret information associated with a corresponding LWE instance;
the request comprises owner identification information of secret information of the LWE instance produced by the second device; and
the identifying comprises identifying an extended LWE instance of which the reuse tag includes the owner identification information that is identical to the owner identification information included in the request, as the target extended LWE instance among the one or more extended LWE instances.

4. The method of claim 1, wherein the providing comprises:
determining whether the LWE instance included in the target extended LWE instance is an available LWE instance; and
in a case that the LWE instance included in the target extended LWE instance is an available LWE instance, providing the LWE instance included in the target extended LWE instance to the first device.

5. The method of claim 4, wherein the reuse tag comprises information associated with a point in time at which a corresponding LWE instance is produced; and
the determining comprises determining, based on the point, whether the LWE instance included in the target extended LWE instance is the available LWE instance.

6. The method of claim 4, wherein the storing comprises storing the one or more extended LWE instances and a counter value for each of the one or more extended LWE instances; and
the determining comprises determining, based on the counter value, whether the LWE instance included in the target extended LWE instance is the available LWE instance.

7. The method of claim 6, further comprising:
after the providing, updating the counter value.

8. A method of managing an LWE instance, the method performed by a computing device comprising at least one processor and a computer-readable storage medium storing one or more programs executed by the at least one processor, the method comprising:
obtaining, from one or more user devices among a plurality of user devices, one or more learning with errors (LWE) instances and one or more extended LWE instances each including a reuse tag associated with each of the one or more LWE instances;
storing the one or more extended LWE instances;
based on the reuse tag, identifying a target extended LWE instance including the LWE instance produced by a first device among the one or more extended LWE instances; and
performing an operation using the LWE instance included in the target extended LWE instance.

9. The method of claim 8, further comprising:
after performing the operation, deleting the target extended LWE instance.

10. The method of claim 8, wherein the reuse tag comprises owner identification information of secret information associated with a corresponding LWE instance; and
the identifying comprises identifying an extended LWE instance of which the reuse tag includes the owner identification information that is identical to owner identification information of secret information associated with the LWE instance produced by the first device, as the target extended LWE instance among the one or more extended LWE instances.

11. The method of claim 8, wherein the performing comprises:
determining whether the LWE instance included in the target extended LWE instance is an available LWE instance; and
in a case that the LWE instance included in the target extended LWE instance is an available LWE instance, performing an operation using the LWE instance included in the target extended LWE instance.

12. The method of claim 11, wherein the reuse tag comprises information associated with a point in time at which a corresponding LWE instance is produced; and
the determining comprises determining, based on the point, whether the LWE instance included in the target extended LWE instance is the available LWE instance.

13. The method of claim 11, wherein the storing comprises storing the one or more extended LWE instances and a counter value for each of the one or more extended LWE instances; and
the determining comprises determining, based on the counter value, whether the LWE instance included in the target extended LWE instance is the available LWE instance.

14. An apparatus of managing an LWE instance, the apparatus comprising one or more processors comprising at least one hardware processor, the one or more processors configured to:
obtain, from one or more user devices among a plurality of user devices, one or more learning with errors (LWE) instances and one or more extended LWE instances each including a reuse tag associated with each of the one or more LWE instances;
store one or more extended LWE instances; and
in a case that a request for an LWE instance produced by a second device among the plurality of user devices is received from a first device among the plurality of user devices, identify, based on the reuse tag, a target extended LWE instance including the LWE instance produced by the second device among the one or more extended LWE instances; and
provide, to the first device, the LWE instance included in the target extended LWE instance.

15. The apparatus of claim 14, wherein the one or more processors are further configured to delete the target extended LWE instance, after the LWE instance included in the target extended LWE instance is provided to the first device.

16. The apparatus of claim 14, wherein the reuse tag comprises owner identification information of secret information associated with a corresponding LWE instance;
the request comprises owner identification information of secret information of the LWE instance produced by the second device; and
wherein the identifying of the target extended LWE instance comprises identifying an extended LWE instance of which the reuse tag includes the owner identification information that is identical to the owner identification information included in the request, as the target extended LWE instance among the one or more extended LWE instances.

17. The apparatus of claim 14, wherein the identifying of the target extended LWE instance comprises determine whether the LWE instance included in the target extended LWE instance is an available LWE instance; and wherein the providing to the first device comprises providing the LWE instance included in the target extended LWE instance to the first device in a case that the LWE instance included in the target extended LWE instance is the available LWE instance.

18. The apparatus of claim 17, wherein the reuse tag comprises information associated with a point in time at which a corresponding LWE instance is produced; and wherein the identifying of the target extended LWE instance comprises determining, based on the point, whether the LWE instance included in the target extended LWE instance is the available LWE instance.

19. The apparatus of claim 17, wherein the identifying of the target extended LWE instance comprises:

storing the one or more extended LWE instances and a counter value for each of the one or more extended LWE instances; and determining, based on the counter value, whether the LWE instance included in the target extended LWE instance is the available LWE instance.

\* \* \* \* \*